N. F. ROADHOUSE.
FRICTIONAL TRANSMISSION MECHANISM.
APPLICATION FILED MAR. 7, 1912.

1,049,149.

Patented Dec. 31, 1912.

2 SHEETS—SHEET 1.

WITNESSES:

INVENTOR
NORMAN F. ROADHOUSE.

BY
E. S. Wheeler
ATTORNEY

N. F. ROADHOUSE.
FRICTIONAL TRANSMISSION MECHANISM.
APPLICATION FILED MAR. 7, 1912.
1,049,149.
Patented Dec. 31, 1912.
2 SHEETS—SHEET 2.
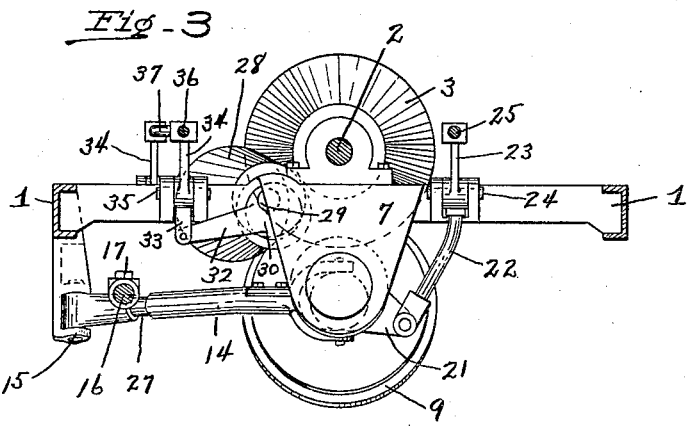
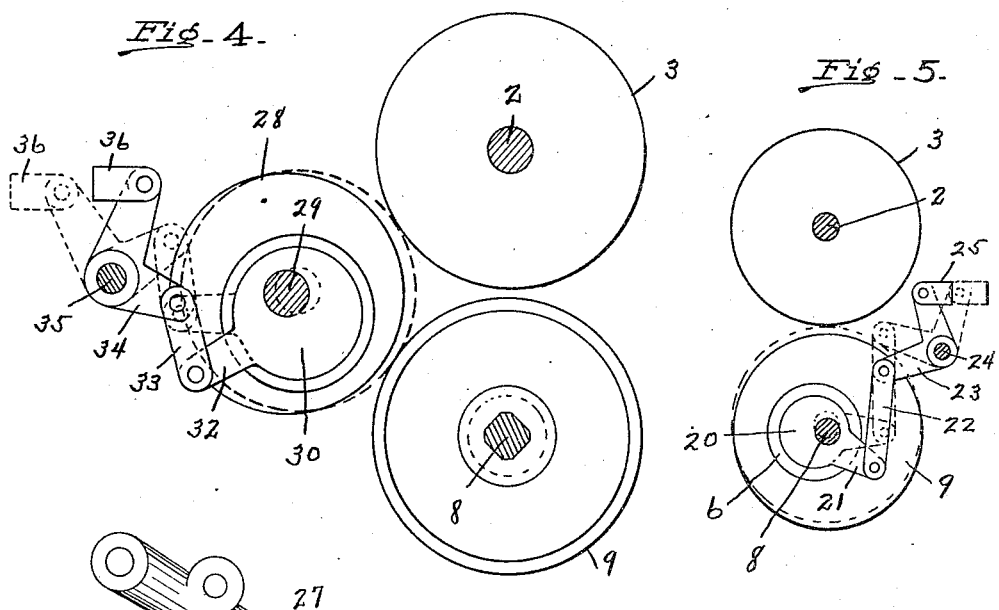
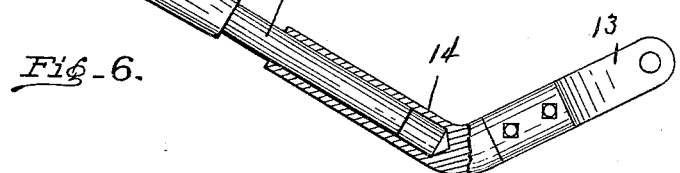
WITNESSES:
INVENTOR
NORMAN F. ROADHOUSE.
BY
E. S. Wheeler
ATTORNEY

UNITED STATES PATENT OFFICE.

NORMAN F. ROADHOUSE, OF DETROIT, MICHIGAN, ASSIGNOR TO ALBERT F. SELLERS AND ELIAS H. SELLERS, BOTH OF DETROIT, MICHIGAN.

FRICTIONAL TRANSMISSION MECHANISM.

1,049,149.　　　Specification of Letters Patent.　　Patented Dec. 31, 1912.

Application filed March 7, 1912. Serial No. 682,216.

*To all whom it may concern:*

Be it known that I, NORMAN F. ROADHOUSE, a citizen of the United States, residing at Detroit, in the county of Wayne, State of Michigan, have invented certain new and useful Improvements in Frictional Transmission Mechanism; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to transmission mechanism especially adapted for transmitting power from a prime mover to the driven shaft of a motor vehicle but adaptable for other purposes and consists in the construction and arrangement of parts hereinafter more fully set forth and pointed out in the claims.

The object of the invention is to provide simple and efficient transmission mechanism of the friction type, wherein provision is made for transmitting power from the motor to the driven shaft in a manner to attain the desired variations of speed, provision being made for reversing the direction of the rotation of the driven shaft at variable speeds in a simple and efficient manner.

The above object is attained by the mechanism illustrated in the accompanying drawings, in which:—

Figure 1:
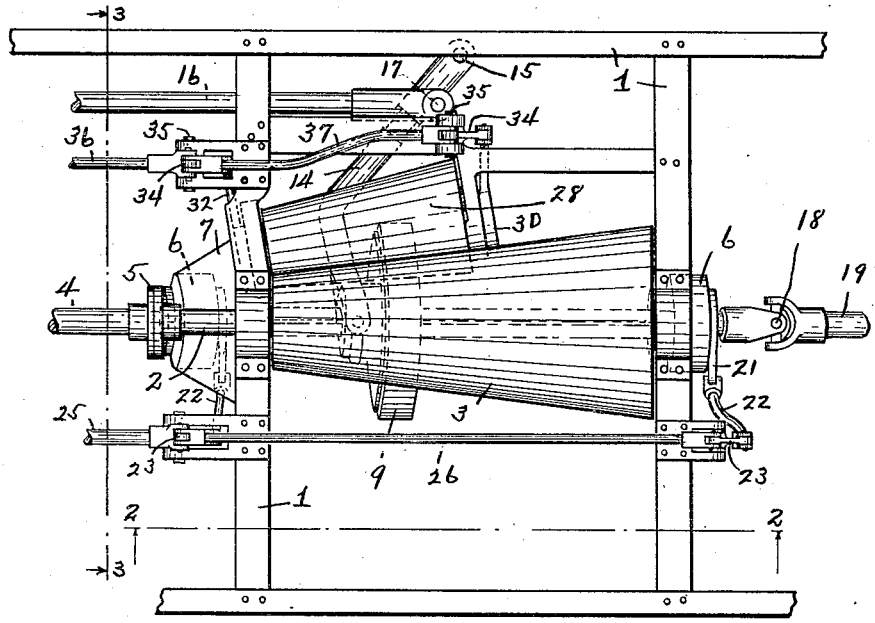
Figure 2:
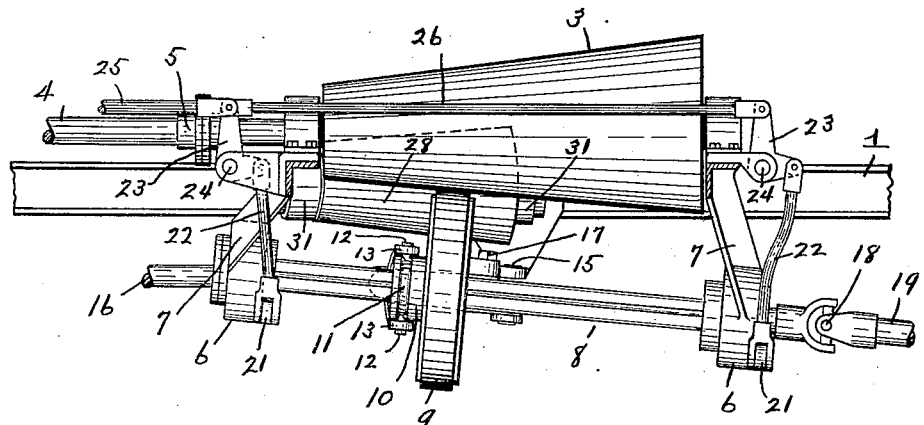

Figure 1 is a plan view of a frictional transmission mechanism embodying my invention, showing said mechanism mounted in the frame of a motor vehicle, parts of which, and of the shafts and operating rods, being broken away. Fig. 2 is a side elevation of the transission mechanism, the frame being in section, as on line 2—2 of Fig. 1. Fig. 3 is a transverse section, as on line 3—3 of Fig. 1. Fig. 4 is a diagrammatical view of the transmitting cones and disks, expressly drawn to illustrate the operation of the eccentric bearings for the shaft of the reversing cone. Fig. 5 is a similar view drawn to illustrate the method of actuating the eccentric bearings of the shaft of the slidable transmission disk. Fig. 6 is a fragmentary view partly in section, of the telescopic arm or lever, through the medium of which the slidable transmitting disk is actuated.

Referring to the drawings, by the characters of reference marked thereon, 1 designates the frame of a motor vehicle. Suitably journaled in said frame is a shaft 2, on which the main driving cone 3 is mounted. The prime mover or motor is not illustrated, but the shaft 4 thereof is shown connected through a coupling 5 with a cone shaft 2. Journaled in suitable bearing boxes 6, which are supported by the hangers 7, is a counter-shaft 8, which between the bearing boxes 6 is square. Mounted on said shaft 8 to slide longitudinally thereof, is a frictional transmission disk 9. The disk 9 is provided with a hub member 10, having a peripheral channel 11 therein. Extending into said channel are the pins 12 carried by the fork sides 13 at the free end of the operating arm or lever 14, which is pivoted at 15 to the frame, and is adapted to be actuated by a rod 16, pivotally connected at 17, thereto. By swinging the arm or lever 14 upon its pivot, the disk 9 may be caused to slide longitudinally of its shaft 8.

Connected with the counter-shaft 8, through the medium of the universal coupling 18, is the driven shaft 19, which will be connected with the axle of the vehicle, not shown in the usual way.

The axes of the cone 3 and the shaft 8 are divergent, an arrangement which causes the periphery of said cone to stand parallel to said shaft, thereby enabling the disk 9 to have peripheral contact with said cone at any point of adjustment along the shaft 8.

To provide for shifting the shaft 8 so as to carry the disk 9 into engagement with the periphery of the cone 3, and from engagement therewith, the journals at the ends of the shaft 8 are mounted eccentrically in rotatable bearing members 20 within the boxes 6, as plainly illustrated diagrammatically in Fig. 5. Connected to each of the rotatable bearing members 20 is an arm 21, to the free end of which is pivoted the lower end of a link 22, the upper end of said link being pivoted to one arm of a bell crank lever 23 fulcrumed at 24. To the other arm of said bell crank lever is pivoted an actuating rod 25. To insure the simultaneous operation of the eccentric bearings 20 of the shaft 8, the bell crank levers 23 are connected by a connecting rod 26, as clearly shown in Fig. 2. By a movement of the rod 25, the eccentric bearings 20 may be rotated in the boxes 6 to swing the shaft 8, so as to carry the disk 9 toward or from the cone 3, as illustrated by dotted lines in Fig. 5.

By sliding the disk 9 along the shaft 8, it may be made to encounter the periphery of the cone 3 at any desired point thereon, and may be driven therefrom at a rate of speed which is varied accordingly as the disk is driven from contact with said cone at various points between the minimum and maximum diameters thereof. In order to provide for the wide sweep of the arm or lever 14 necessary to slide the disk 9 from end to end of the shaft 8, said lever is made telescopic, as shown in Fig. 6, the smaller part 27 thereof sliding within the larger hollow part to accommodate said movement. When the disk 9 shall have been moved upon the shaft to cause its periphery to engage a point on the periphery of the cone 3 to afford the desired speed, said disk may be urged into contact with said cone, to avoid slippage between said parts by an actuation of the eccentric bearings 20 of the shaft 8 of said disk, as will be well understood.

To reverse the direction of rotation of the driven shaft 19, there is employed a reversing cone 28, which is mounted on a shaft 29, inclined with respect to the cone 3, in order to dispose the peripheries of the cones 3 and 28 in parallelism. The cone 28 will be normally out of contact with the cone 3. To provide for carrying the cone 28 into peripheral contact with the cone 3, the shaft 29 of the cone 28, is eccentrically journaled at its ends in bearings 30 rotatably mounted in boxes 31, supported in the frame, as shown diagrammatically in Fig. 4. Projecting from each of the rotatable bearing members 30 is an arm 32. Pivoted at its lower end to the outer end of each of said arms is a link 33, the upper end of each of said links being pivoted to one arm of a bell crank lever 34. The bell crank levers 34 are fulcrumed at 35, and to one arm of the forward lever is pivoted an actuating rod 36. To provide for a simultaneous operation of the levers 34, their arms are pivotally connected with a connecting rod 37, whereby as the rod 36 is actuated, the bearings 30 will be rotated to carry the cone 28 into peripheral engagement with the cone 3.

The parts have such operative association as to enable the cone 28, by a rotation of the eccentric bearings of its shaft, to be carried into peripheral contact simultaneously with the peripheries of the cone 3 and the disk 9; when said disk is withdrawn from peripheral contact with said cone 3, as illustrated diagrammatically in Fig. 4, whereby the direction of rotation of said disk will be reversed through the cone 28 imparting a reverse rotation to the driven shaft. In this position, the disk 9 may be shifted along its shaft 8 to engage the reversing cone at different points on its periphery, and thereby vary the speed of the driven shaft in reverse.

It will now be apparent that by means of the arrangement herein shown and described, the driven shaft may be readily driven at variable speeds through the medium of the sliding disk 9 and the driving cone 3, and that, when desired, the direction of rotation of said shaft may be reversed at variable speeds through the driving cone, the reversing cone 28 and the disk 9, the arrangement being such as to enable the cones and said disk to be held forcibly in peripheral contact to effect the necessary frictional engagement between them. It will be further understood that the arrangement is such as to enable the disk 9 to be carried entirely free from the periphery of either of the cones, when shifting it along its shaft 9, for the purpose of varying the speed of the driven shaft, thereby enabling the said disk to be moved free from rubbing contact with said cones.

Having thus fully set forth my invention, what I claim as new and desire to secure by Letters Patent is:

1. Frictional transmission mechanism comprising an oblong driving cone, a counter-shaft disposed with its axis parallel with the face of said cone, a friction disk rotatable with said shaft and slidable thereon, said shaft having its ends journaled in adjustable bearings, means for adjusting said bearings in unison to shift the shaft laterally toward and from the cone and maintain its axis in parallelism with the face thereof, an oblong reversing cone having its face parallel with the face of the driving cone and coinciding therewith in degree of taper, means for shifting said disk along said counter-shaft, and means for moving the reversing cone simultaneously into engagement with the driving cone and with said disk.

2. Frictional transmission mechanism comprising a driving cone, a counter-shaft in parallelism with the face of said cone, a disk slidable upon said shaft and rotatable therewith, means for moving said shaft to carry the disk thereon into and out of engagement with the periphery of said cone, means for sliding said disk along said shaft, a reversing cone, means for moving the reversing cone to carry it into contact with said disk and driving cone.

3. In a frictional transmission mechanism, a driving cone, a counter-shaft in parallelism with the face of said cone, a disk slidable on said counter-shaft and rotatable therewith, means for actuating said shaft to carry the disk thereon into engagement with the face of said driving cone, a reversing cone, means for moving the reversing cone into frictional engagement with said driving cone, and into peripheral engagement with said disk, and means for moving said disk longitudinally of the reversing cone when in engagement therewith.

4. Transmission mechanism comprising a driving cone, rotatable about a fixed axis, a counter-shaft parallel with the face of said cone, a friction disk on said counter-shaft, slidable thereon and rotatable therewith, eccentric bearings for the ends of said counter-shaft, means for actuating said eccentric bearings in unison to shift said counter-shaft and carry the disk thereon into and out of contact with the face of said cone, and means for shifting said disk longitudinally of said counter-shaft.

In testimony whereof, I sign this specification in the presence of two witnesses.

NORMAN F. ROADHOUSE.

Witnesses:
H. R. MILLER,
J. OTTO BAENZIGER.

---

Copies of this patent may be obtained for five cents each, by addressing the "Commissioner of Patents, Washington, D. C."